(12) United States Patent
Blankemeyer et al.

(10) Patent No.: US 6,223,890 B1
(45) Date of Patent: May 1, 2001

(54) CONVEYOR SYSTEM

(75) Inventors: James Cornelius Blankemeyer, Bluffton; Gregory Francis Bonifas, Cridersville; Randall Fred Haar, Bowling Green, all of OH (US)

(73) Assignee: MetoKote Corporation, Lima, OH (US)

( * ) Notice: Subject to any disclaimer, the term of this patent is extended or adjusted under 35 U.S.C. 154(b) by 0 days.

(21) Appl. No.: 09/187,865

(22) Filed: Nov. 6, 1998

Related U.S. Application Data

(60) Provisional application No. 60/065,089, filed on Nov. 11, 1997.

(51) Int. Cl.[7] ................................................. B65G 41/00
(52) U.S. Cl. .................................... 198/865.1; 198/861.2; 198/465.4
(58) Field of Search ........................... 198/861.5, 861.2, 198/465.4, 861.3

(56) References Cited

U.S. PATENT DOCUMENTS

| | | | |
|---|---|---|---|
| 1,073,803 | * 9/1913 | Gotuzzo | 198/861.2 |
| 2,604,970 | 7/1952 | Steinhoff | 198/19 |
| 2,975,882 | 3/1961 | Abbey | 198/19 |
| 3,142,373 | * 7/1964 | Pollard | 198/861.2 |
| 3,317,023 | 5/1967 | Ryerson et al. | 198/19 |
| 3,343,650 | 9/1967 | Brown | 198/117 |
| 3,658,197 | 4/1972 | DiDonato | 214/89 |
| 3,684,080 | 8/1972 | Van Nest | 198/177 R |
| 3,707,218 | * 12/1972 | Payne et al. | 198/861.2 |
| 4,144,965 | * 3/1979 | Allredge et al. | 198/861.2 |
| 4,252,229 | 2/1981 | Corbett | 198/342 |
| 4,268,206 | 5/1981 | Johnson | 414/222 |
| 4,618,057 | * 10/1986 | Howser | 198/861.2 |
| 4,730,716 | * 3/1988 | Enneking et al. | 198/861.2 |
| 5,043,052 | 8/1991 | Sakai | 204/299 R |
| 5,058,730 | * 10/1991 | Opperthauser | 198/861.2 |
| 5,101,734 | * 4/1992 | Sakai | 198/861.2 |
| 5,163,545 | * 11/1992 | David | 198/861.2 |
| 5,568,857 | * 10/1996 | Chen et al. | 198/861.5 |
| 5,620,080 | 4/1997 | Kassuba | 198/343.1 |

\* cited by examiner

*Primary Examiner*—Douglas Hess
(74) *Attorney, Agent, or Firm*—Killworth, Gottman, Hagan & Schaeff LLP

(57) ABSTRACT

A conveyor system is provided comprising a plurality of conveyor sections, a plurality of movable load bearing assemblies, a conveyor linkage assembly, a first hinge assembly, and a second hinge assembly. The plurality of conveyor sections define a conveying path extending from an upstream conveyor section, through at least one intermediate conveyor section, to a downstream conveyor section. The plurality of movable load bearing assemblies are secured to at least one of the conveyor sections such that the load bearing assemblies are free to move along the conveying path from an upstream location to a downstream location. The conveyor linkage assembly is arranged to couple the movable load bearing assemblies for collective movement along the conveying path. The first hinge assembly is arranged to couple a first end of a selected intermediate conveyor section to an adjacent upstream conveyor section and is further arranged to permit inclination of the intermediate conveyor section relative to the adjacent upstream conveyor section. The second hinge assembly is arranged to couple a second end of the selected intermediate conveyor section to an adjacent downstream conveyor section and is further arranged to permit declination of the downstream conveyor section relative to the intermediate conveyor section.

25 Claims, 14 Drawing Sheets

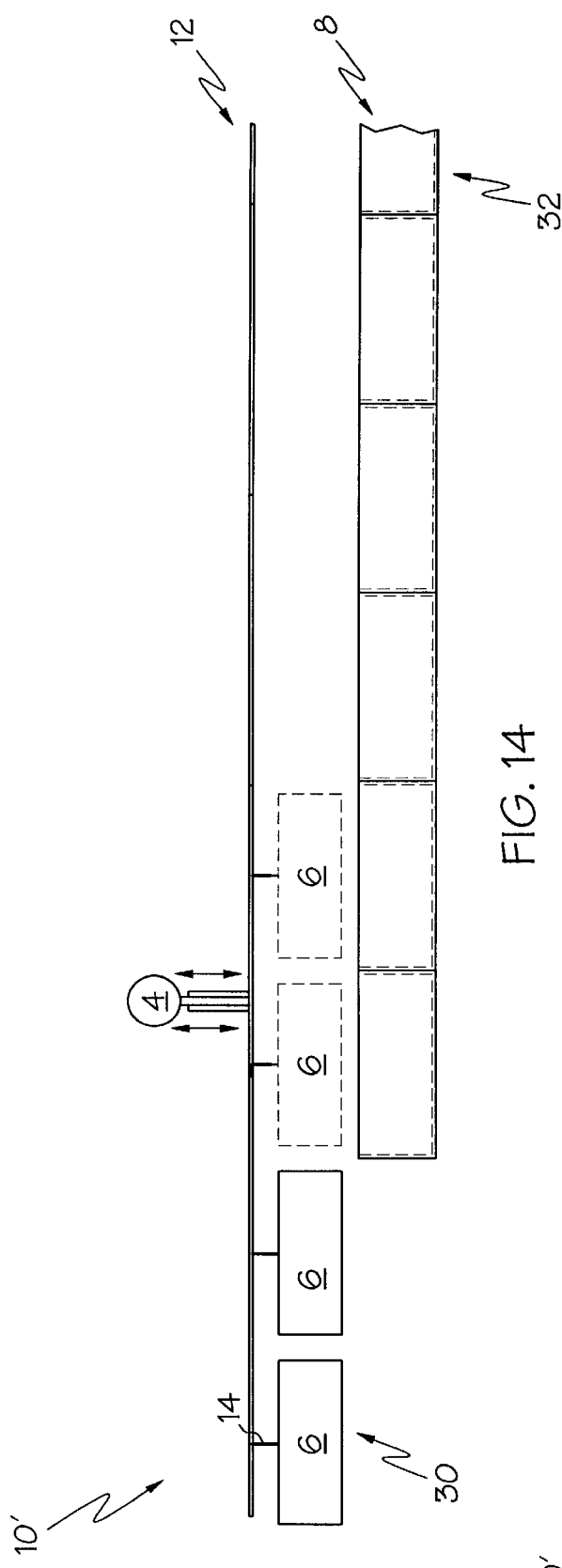
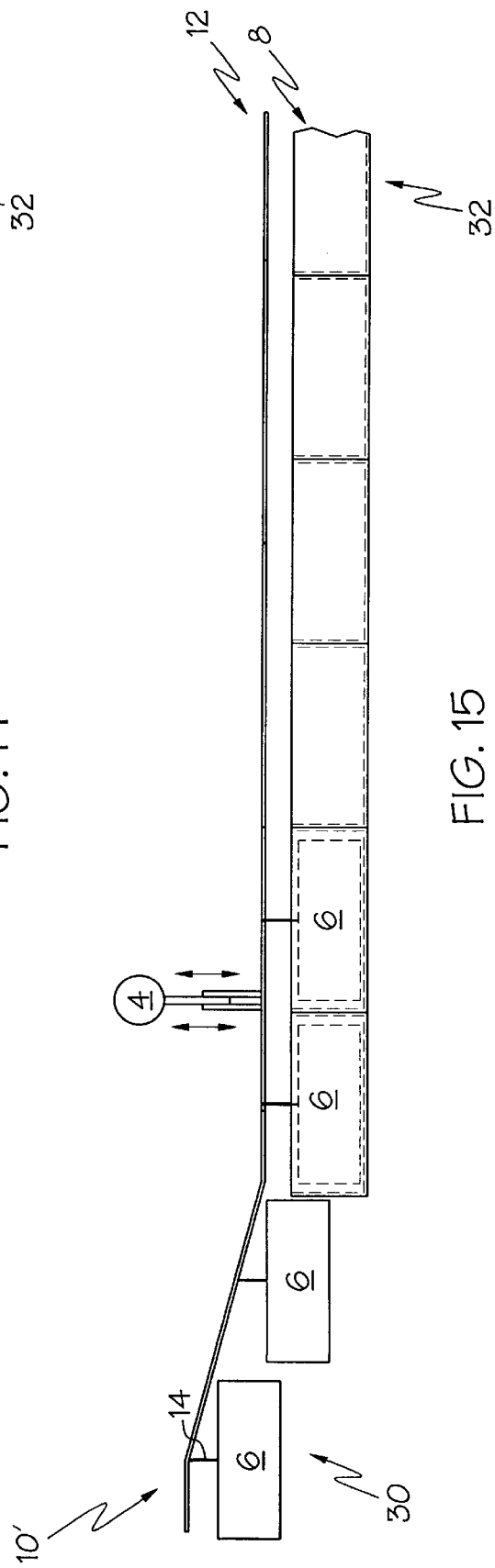

CONVEYOR SYSTEM

CROSS REFERENCE TO RELATED APPLICATIONS

This application claims the benefit of U.S. Provisional Application Ser. No. 60/065,089, for INDEXING MONORAIL CONVEYOR, filed Nov. 11, 1997.

BACKGROUND OF THE INVENTION

The present invention relates to article processing systems and, more particularly, to a conveyor system for moving an article along a conveying path to successive processing stations.

Article processing systems commonly employ an elevator/conveyor system that moves articles to be treated or processed to work stations positioned along a conveyor path. An elevator mechanism is utilized to raise and lower the articles to and from selected work stations, e.g., processing tanks, along the path. In this manner, the articles are successively moved from a loading/unloading station to and through a succession of work stations and returned to the loading/unloading station. These conventional processing systems are well suited for processing a plurality of articles according to a predetermined procedure. However, such conventional processing systems are often expensive to produce and costly to operate and maintain because of the relative complexity of their design.

Another type of system employs a continuous conveyor with fixed successive declined and inclined sections for immersing an object in a processing tank and subsequently removing the object from the tank. The degree of decline and incline necessitates relatively large volume processing tanks and extended conveying paths. Further, the time between processing steps tends to be excessive in some cases.

Accordingly, there is a need for a conveyor system that enables efficient mass production processing and minimizes the costs associated with design, manufacture, operation, and maintenance of the conveyor system.

BRIEF SUMMARY OF THE INVENTION

This need is met by the present invention wherein a conveyor system is provided comprising a plurality of conveyor sections linked via respective hinge assemblies arranged to permit inclination or declination of selected conveyor sections relative to adjacent upstream and downstream conveyor sections. The concepts of the present invention may be applied in a monorail type conveyor system or in what is commonly referred to as a power and free conveyor system.

In accordance with one embodiment of the present invention, a conveyor system is provided comprising a plurality of conveyor sections, a plurality of movable load bearing assemblies, a conveyor linkage assembly, a first hinge assembly, and a second hinge assembly. The plurality of conveyor sections define a conveying path extending from an upstream conveyor section, through at least one intermediate conveyor section, to a downstream conveyor section. The plurality of movable load bearing assemblies are secured to at least one of the conveyor sections such that the load bearing assemblies are free to move along the conveying path from an upstream location to a downstream location. The conveyor linkage assembly is arranged to couple the movable load bearing assemblies for collective movement along the conveying path. The first hinge assembly is arranged to couple a first end of a selected intermediate conveyor section to an adjacent upstream conveyor section and is further arranged to permit inclination of the intermediate conveyor section relative to the adjacent upstream conveyor section. The second hinge assembly is arranged to couple a second end of the selected intermediate conveyor section to an adjacent downstream conveyor section and is further arranged to permit declination of the downstream conveyor section relative to the intermediate conveyor section.

The intermediate conveyor section may comprise a plurality of transitional conveyor subsections and a transitional hinge assembly defining a transitional conveying path extending between the upstream conveyor section and the downstream conveyor section. The transitional hinge assembly preferably permits the plurality of transitional conveyor subsections to define a net inclination of the intermediate conveyor section collectively relative to the upstream conveyor section Further the transitional hinge assembly preferably permits one of the transitional conveyor subsections to decline relative to another of the transitional conveyor subsections. The transitional conveyor subsections may be coupled to each other along the transitional conveying path through respective transitional hinge assemblies. At least one of the transitional conveyor subsections may define a curve along the conveying path in the direction of the inclined orientation. One of the transitional conveyor subsections may be arranged to define an ascending curve along the conveying path and another of the transitional conveyor subsections may be arranged to define a descending curve along the conveying path.

According to one aspect of the present invention, the intermediate conveyor section may comprise first, second, and third transitional conveyor subsections. The first transitional conveyor subsection is coupled to the adjacent upstream conveyor section via the first hinge assembly. The second transitional conveyor subsection may be coupled to the first subsection via a first transitional hinge assembly. The third transitional conveyor subsection may be coupled to the second subsection via an additional transitional hinge assembly and may be coupled to the adjacent downstream conveyor section via the second hinge assembly. The first hinge assembly is preferably arranged to permit inclination of the first transitional conveyor subsection relative to the adjacent upstream conveyor section and to permit inclination of the second transitional conveyor subsection relative to the first transitional conveyor subsection. The second transitional hinge assembly is arranged to permit declination of the third transitional conveyor subsection relative to the second transitional conveyor subsection, and to permit declination of the adjacent downstream conveyor section relative to the third transitional conveyor subsection. The first transitional conveyor subsection preferably defines an ascending curve along the conveying path and the third transitional conveyor subsection defines a descending curve along the conveying path. The ascending curve is preferably defined by substantially the entire length of the first transitional conveyor subsection and the descending curve is preferably defined by substantially the entire length of the third transitional conveyor subsection.

The conveyor sections may define respective I-shaped cross sections, the movable load bearing assemblies may comprise respective hangers supported by a lower portion of the I-beam cross section via a pair of wheels secured to respective ones of the hangers, and the pair of wheels may be positioned on opposite sides of a longitudinal portion of the I-shaped cross section.

The conveyor linkage assembly may comprise a series of chain links arranged to couple the plurality of movable load bearing assemblies to each other along the conveying path. Preferably, adjacent ones of the chain links are arranged to incorporate sufficient mechanical play relative to one another to correspond to the recited inclination and declination of the respective conveyor sections.

The first and second hinge assemblies are positioned outside of the conveying path, such that respective ones of the plurality of movable load bearing assemblies and the conveyor linkage assembly may move along the conveying path unobstructed by the first and second hinge assemblies. The first and second hinge assemblies may each include respective hinge subassemblies positioned on opposite sides of the conveying path. Each hinge subassembly includes a pair of outer hinge plates coupled to one of the conveyor sections and an inner hinge plate coupled to an adjacent conveyor section, and wherein the inner hinge plate is positioned between the pair of outer hinge plates and is free to rotate about a hinge pivot relative to the outer hinge plates. Each hinge assembly may include a pair of outer hinge plates coupled to one of the conveyor sections and an inner hinge plate coupled to an adjacent conveyor section. The inner hinge plate may be positioned between the pair of outer hinge plates and is free to rotate about a hinge pivot relative to the outer hinge plates.

In accordance with another embodiment of the present invention, a conveyor system is provided comprising a plurality of conveyor sections, a plurality of movable load bearing assemblies, a conveyor linkage assembly, a first hinge assembly, and a second hinge assembly. The plurality of conveyor sections define a conveying path extending from an upstream conveyor section, through at least one intermediate conveyor section, to a downstream conveyor section. The plurality of movable load bearing assemblies are secured to at least one of the conveyor sections such that the load bearing assemblies are free to move along the conveying path from an upstream location to a downstream location. The conveyor linkage assembly is arranged to couple the movable load bearing assemblies for collective movement along the conveying path. The first hinge assembly is arranged to couple a first end of a selected intermediate conveyor section to an adjacent upstream conveyor section and to permit declination of the intermediate conveyor section relative to the adjacent upstream conveyor section. The second hinge assembly is arranged to couple a second end of the selected intermediate conveyor section to an adjacent downstream conveyor section and to permit inclination of the downstream conveyor section relative to the intermediate conveyor section.

The intermediate conveyor section preferably comprises a plurality of transitional conveyor subsections and a transitional hinge assembly defining a transitional conveying path extending between the upstream conveyor section and the downstream conveyor section. The transitional hinge assembly permits the plurality of transitional conveyor subsections to define collectively a net declination of the intermediate conveyor section relative to the upstream conveyor section and permits one of the transitional conveyor subsections to incline relative to another of the transitional conveyor subsections. One of the transitional conveyor subsections is preferably arranged to define a descending curve along the conveying path and another of the transitional conveyor subsections is preferably arranged to define an ascending curve along the conveying path.

According to one aspect of the present invention, the intermediate conveyor section may comprise first, second, and third conveyor subsections. The first transitional conveyor subsection may be coupled to the adjacent upstream conveyor section via the first hinge assembly. The second transitional conveyor subsection may be coupled to the first subsection via a first transitional hinge assembly. The third transitional conveyor subsection may be coupled to the second subsection via an additional transitional hinge assembly and may be coupled to the adjacent downstream conveyor section via the second hinge assembly. The first hinge assembly is preferably arranged to permit declination of the first transitional conveyor subsection relative to the adjacent upstream conveyor section. The first transitional hinge assembly is preferably arranged to permit declination of the second transitional conveyor subsection relative to the first transitional conveyor subsection. The second transitional hinge assembly is preferably arranged to permit inclination of the third transitional conveyor subsection relative to the second transitional conveyor subsection. Finally, the second hinge assembly is arranged to permit inclination of the adjacent downstream conveyor section relative to the third transitional conveyor subsection. The first transitional conveyor subsection may define a descending curve along the conveying path and the third transitional conveyor subsection defines an ascending curve along the conveying path.

In accordance with yet another embodiment of the present invention, a conveyer system is provided comprising a plurality of conveyor sections, a plurality of movable load bearing assemblies, a conveyor linkage assembly, a first hinge assembly, a second hinge assembly, at least one product treatment station, and at least one load displacement mechanism. The plurality of conveyor sections define a conveying path extending from an upstream conveyor section, through at least one intermediate conveyor section, to a downstream conveyor section. The plurality of movable load bearing assemblies are secured to at least one of the conveyor sections such that the load bearing assemblies are free to move along the conveying path from an upstream location to a downstream location. The conveyor linkage assembly is arranged to couple the movable load bearing assemblies for collective movement along the conveying path. The first hinge assembly is arranged to couple a first end of a selected intermediate conveyor section to an adjacent upstream conveyor section and to permit inclination of the intermediate conveyor section relative to the adjacent upstream conveyor section. The second hinge assembly is arranged to couple a second end of the selected intermediate conveyor section to an adjacent downstream conveyor section and to permit declination of the downstream conveyor section relative to the intermediate conveyor section. The product treatment station is positioned along the conveying path. The load displacement mechanism is operative to initiate selectively the inclination and the declination of a selected intermediate conveyor section such that a product coupled to a load bearing assembly is positioned selectively within the product treatment station. The load displacement mechanism may be coupled to either the upstream conveyor section or the downstream conveyor section.

Accordingly, it is an object of the present invention to provide a conveyor system that enables efficient mass production processing and minimizes the costs associated with design, manufacture, operation, and maintenance of the conveyor system. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like reference numerals are utilized to indicate like structure, and wherein:

FIGS. 14 and 15 are schematic illustrations of a conveyer system according to an alternative embodiment of the present invention.

DETAILED DESCRIPTION OF THE PREFERRED EMBODIMENTS

Figure 1:
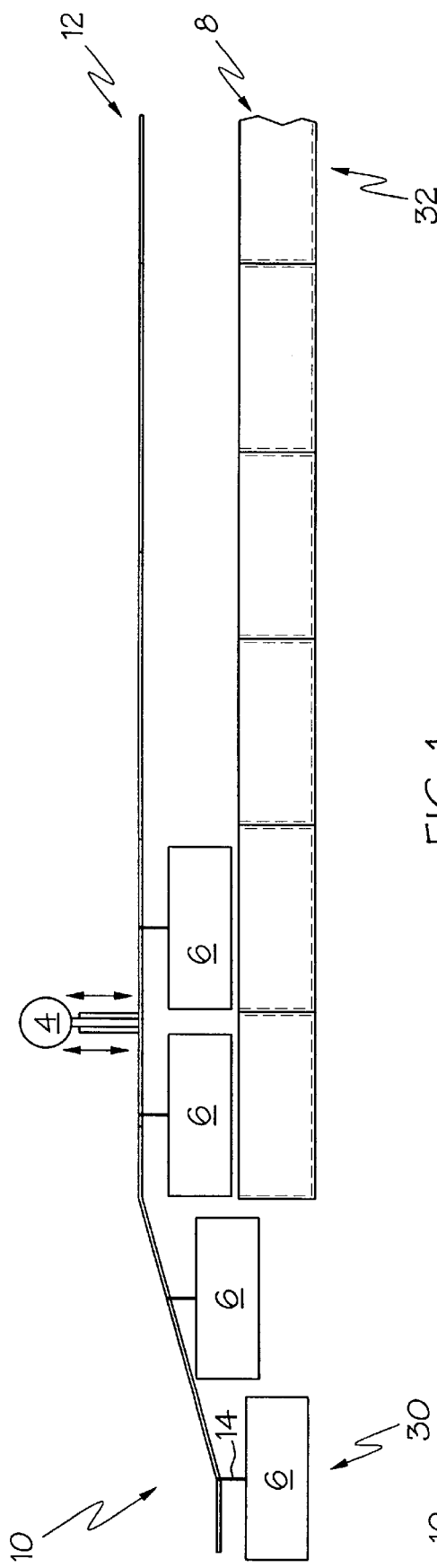
FIGS. 1 and 2 are schematic illustrations of a conveyer system according to the present invention.
Figure 2:
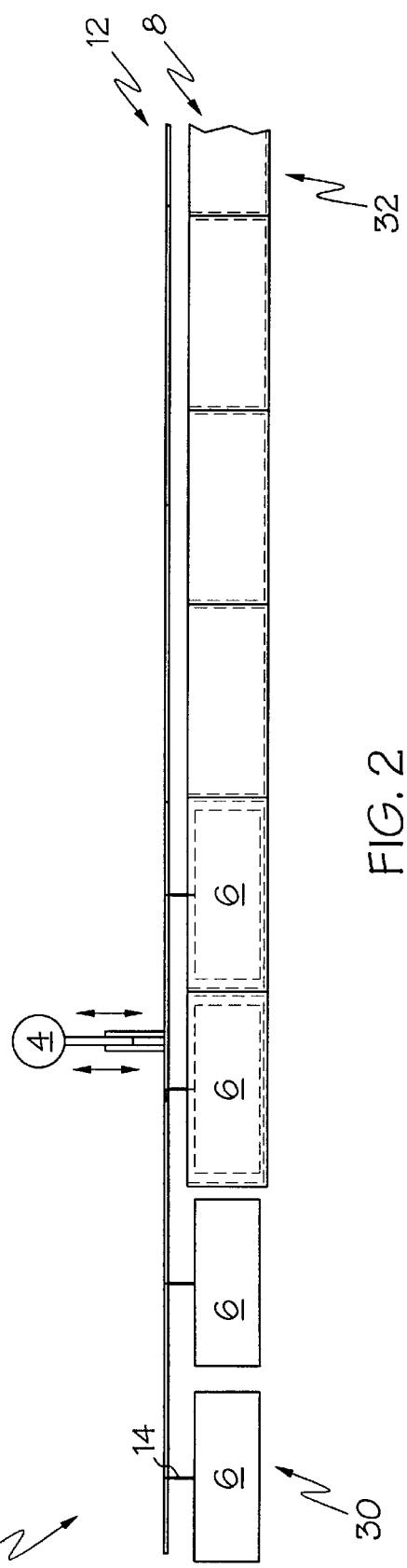
Figure 5:
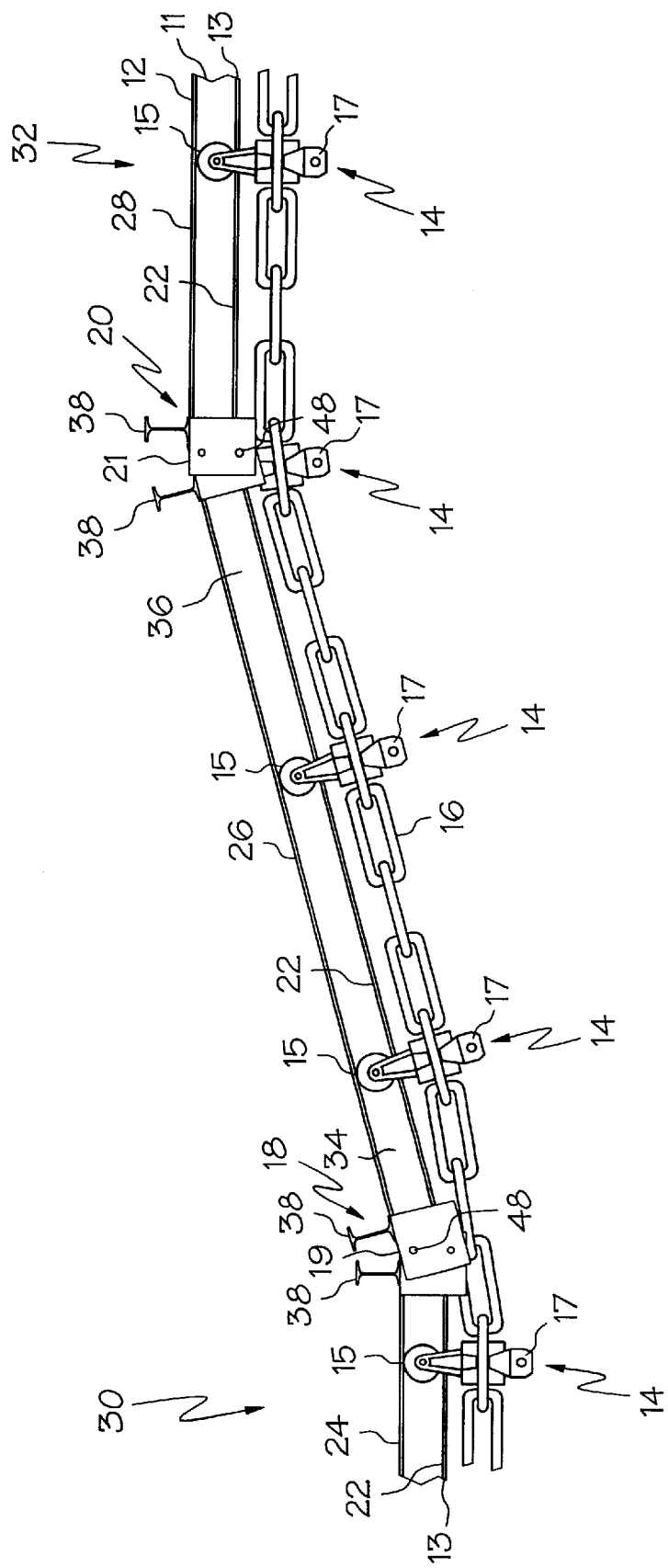
FIG. 5 is an illustration of the conveyor section of FIG. 3, in the inclined or declined state, and including a further illustration of related load bearing and linkage assemblies.

Referring initially to FIGS. 1, 2, and 5 a conveyor system 10 according to the present invention comprises a plurality of conveyor sections 12, a plurality of movable load bearing assemblies 14, a conveyor linkage assembly 16, and first and second hinge assemblies 18, 20. The conveyor linkage assembly 16, and first and second hinge assemblies 18, 20 are illustrated in FIGS. 2 and 5. A load displacement mechanism 4 is provided to initiate selective inclination or declination of a selected conveyor section 12 such that a product or article 6 coupled to a corresponding load bearing assembly 14 may be positioned within or removed from a corresponding one of a plurality of product treatment stations 8. The products 6 are moved successively from one treatment station 8 to the next through advancement of the conveyor linkage assembly 16.

Figure 3:
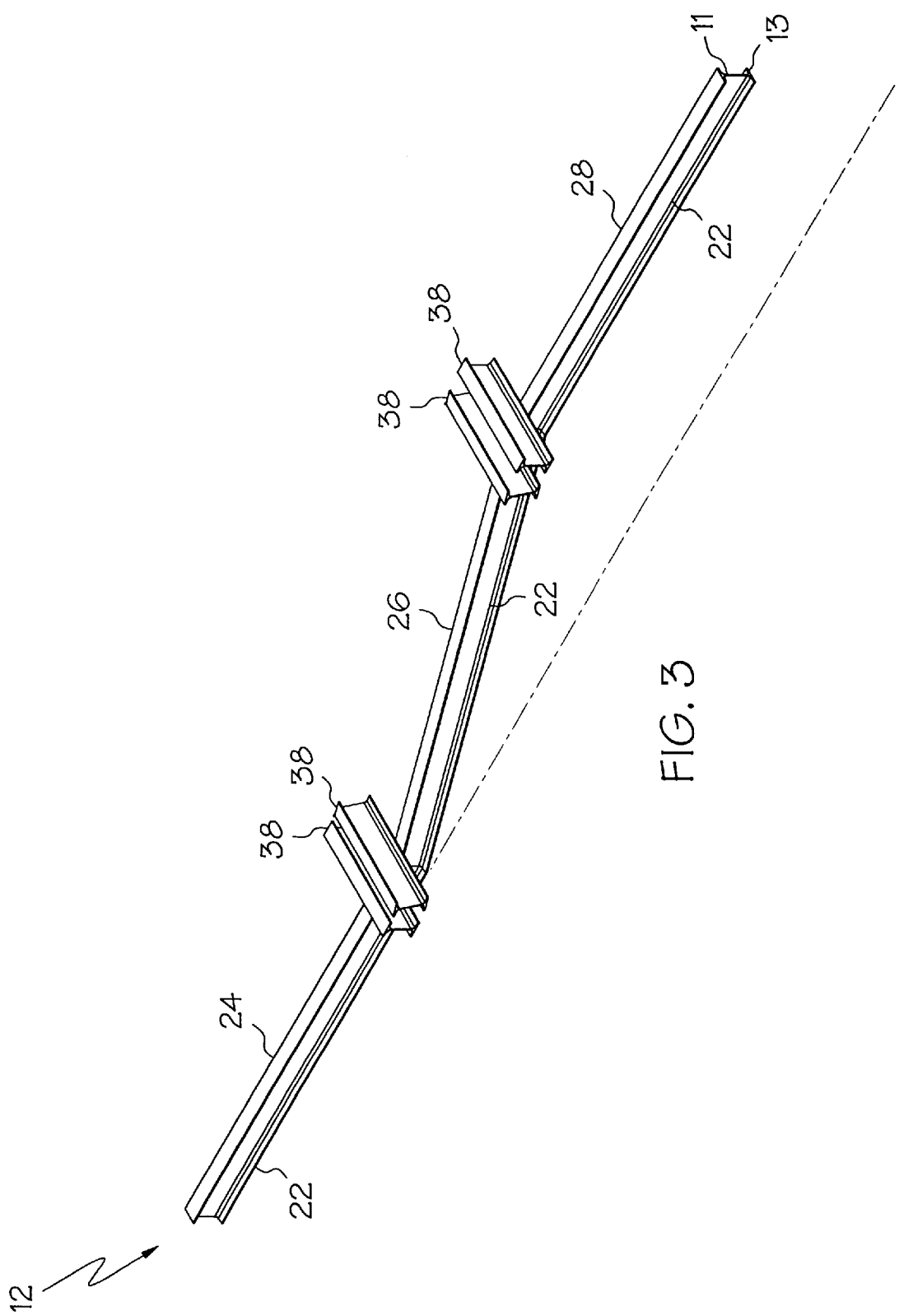
FIG. 3 is an isometric view of a conveyor system according to one embodiment of the present invention where a selected conveyor section is in an inclined or declined state.
Figure 6:
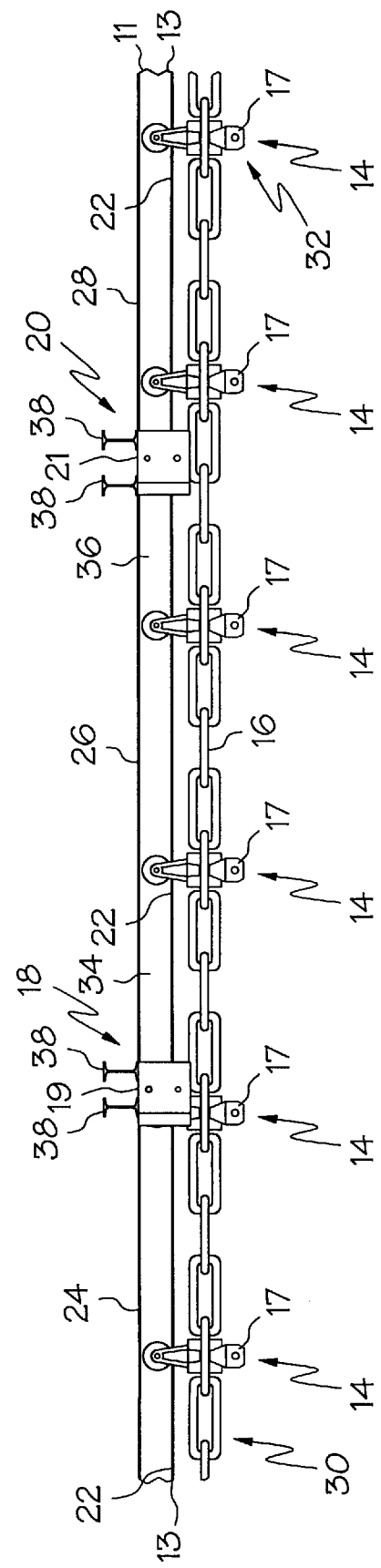
FIG. 6 is an illustration of the conveyor section of FIG. 4, in the non-inclined or non-declined state, and including a further illustration of load bearing and linkage assemblies according to one aspect of the present invention.

Referring additionally to FIG. 3, the plurality of conveyor sections 12 define a conveying path 22 extending from an upstream conveyor section 24, through at least one intermediate conveyor section 26, to a downstream conveyor section 28. The movable load bearing assemblies 14 illustrated in FIG. 5 are secured to the conveyor sections 12 such that the load bearing assemblies 14 are free to move along the conveying path 22 from an upstream location 30 to a downstream location 32 (see FIGS. 1, 2, and 5). According to the illustrated embodiment, the conveyor sections 12 comprise I-beams, i.e., they define respective I-shaped cross sections. The movable load bearing assemblies 14 comprise respective hangers 17 supported by a lower portion 13 of the I-beam cross section via a pair of wheels 15 secured to respective ones of the hangers 17. The pair of wheels 15 are positioned on opposite sides of a central longitudinal portion 11 of the I-shaped cross section (see FIGS. 3, 5, and 6). To preserve clarity of illustration, only one wheel 15 of each respective pair is shown in FIGS. 5 and 6. As would be appreciated by those practicing the present invention, the structure of each wheel not shown in the figures is substantially identical to those illustrated, with the exception that the wheels not illustrated are positioned so as to be supported by the lower portion 13 of the I-beam on the opposite side of the central longitudinal portion 11.

The conveyor linkage assembly 16 illustrated in FIGS. 5 and 6 is arranged to couple the movable load bearing assemblies 14 for collective movement along the conveying path 22. As is illustrated in FIGS. 5 and 6, the conveyor linkage assembly 16 comprises a series of chain links arranged to couple the plurality of movable load bearing assemblies 14 to each other along the conveying path 22. It is important to note that adjacent chain links are arranged to incorporate sufficient mechanical play relative to one another to permit the above-described inclination and declination of the respective conveyor sections. One example of a linkage assembly that may be utilized in practicing the present invention is available from Frost Incorporated, Grand Rapids, Mich., under the product designation I-Beam trolley and chain.

Figure 4:
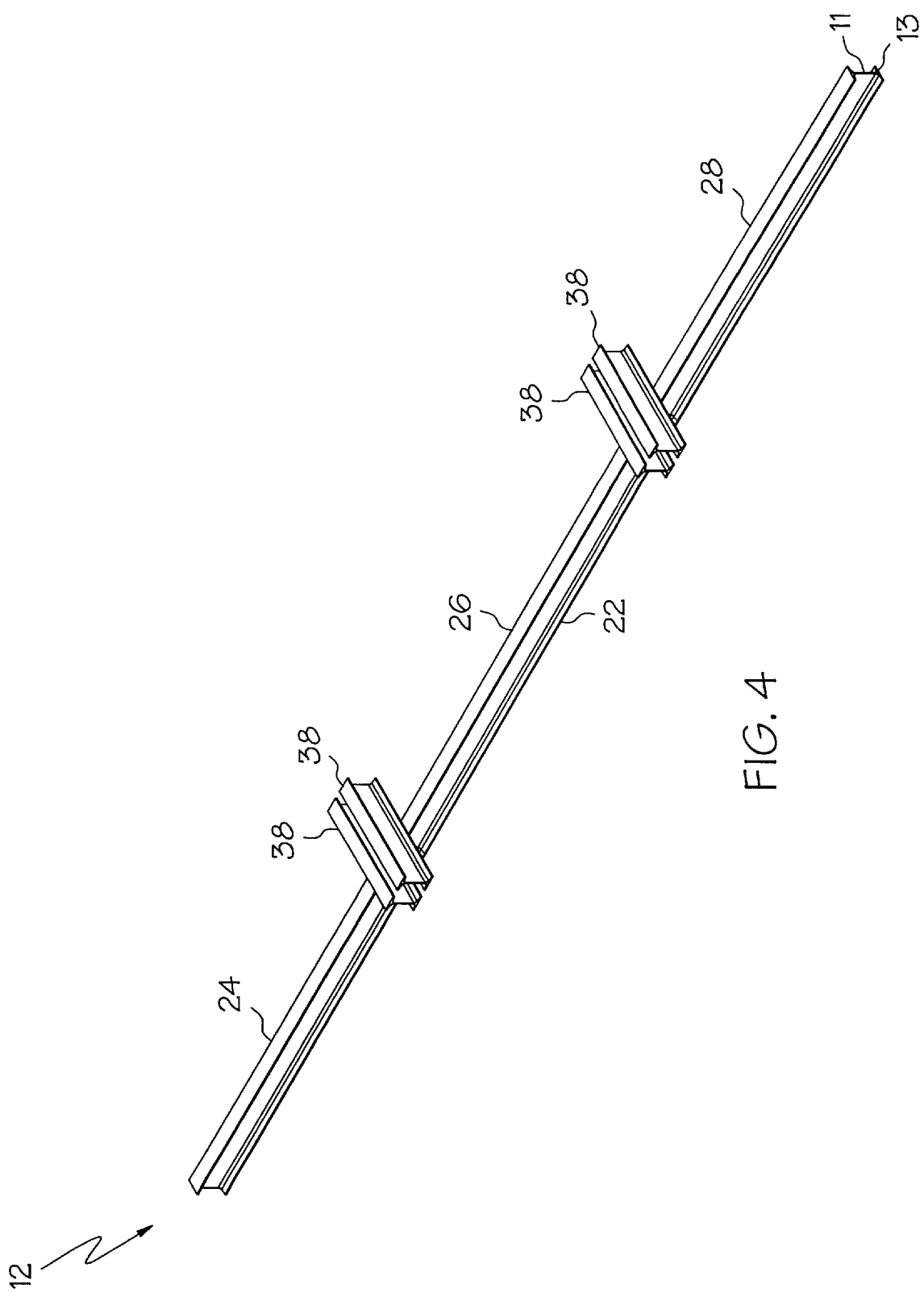
FIG. 4 is an isometric view of the conveyor system of FIG. 3 where the selected conveyor section is not inclined or declined.

The first hinge assembly 18 is arranged to couple a first end 34 of the intermediate conveyor section 26 to the adjacent upstream conveyor section 24 and is further arranged to permit inclination of the intermediate conveyor section 26 relative to the adjacent upstream conveyor section 24. The second hinge assembly 20 is arranged to couple a second end 36 of the selected intermediate conveyor section 26 to the adjacent downstream conveyor section 28 and is further arranged to permit declination of the downstream conveyor section 28 relative to the intermediate conveyor section 26. In this manner, the conveyor sections 12 may move between an inclined orientation, see FIGS. 1, 3, and 5, and a substantially planar, non-inclined orientation, see FIGS. 2, 4, and 6. As is illustrated in FIGS. 1 and 2, the inclined orientation is typically utilized to position articles or products 6 above corresponding product treatment stations 8 and the non-inclined orientation is utilized to position products 6 within the corresponding product treatment stations 8. Alternatively, referring to FIGS. 14 and 15, the non-inclined orientation of the conveyor system 10' can be utilized to position products 6 above corresponding product treatment stations 8, see FIG. 14, and the declined orientation can be utilized to position products 6 within the corresponding product treatment stations 8, see FIG. 15. According to this alternative configuration, as would be appreciated by those practicing the present invention, the upstream location 30 and the downstream location 32 illustrated in FIGS. 5 and 6 would be switched from left to right and right to left, respectively.

Figure 7:
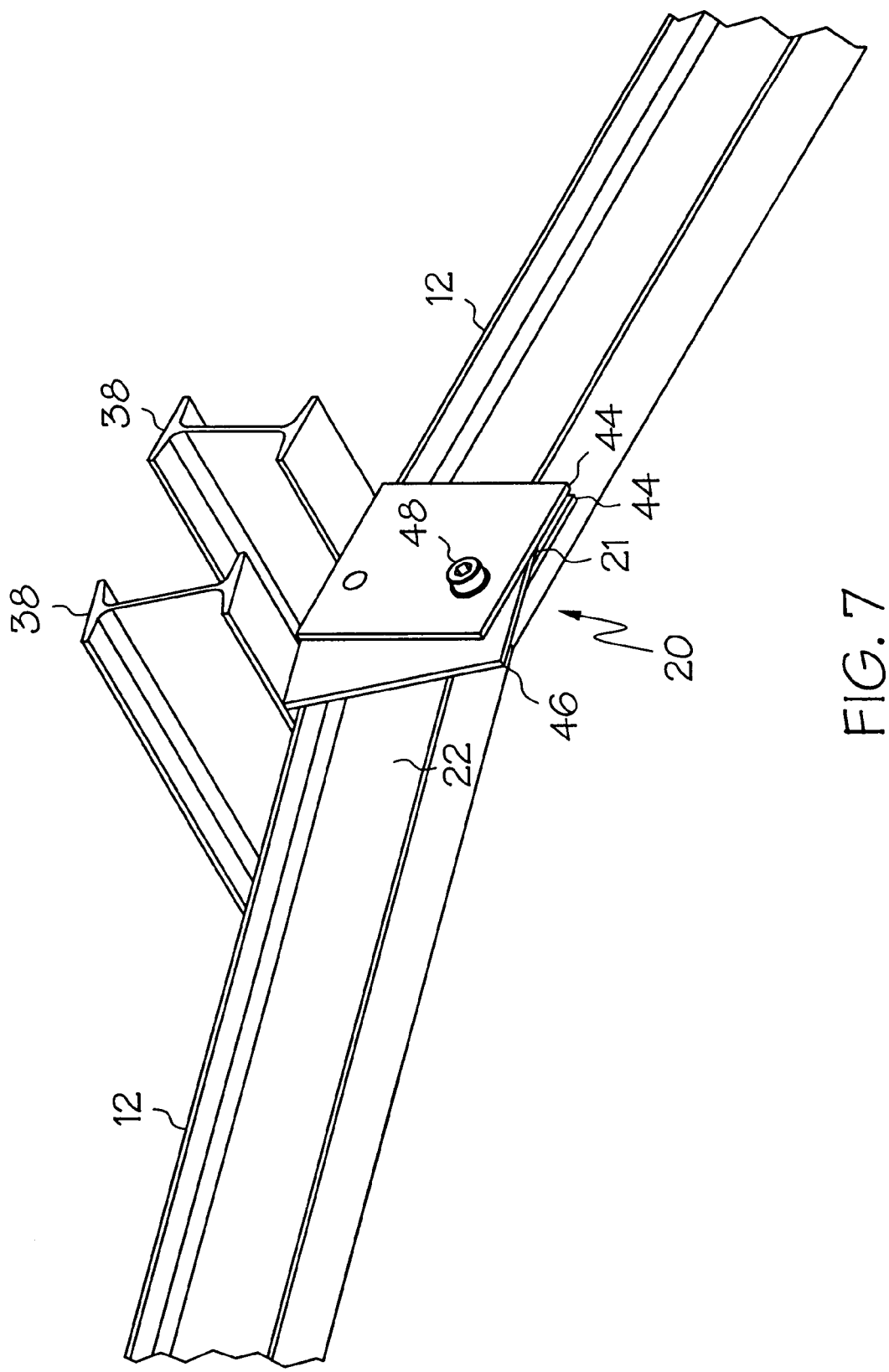
FIG. 7 is an isometric illustration of a hinge assembly according to one aspect of the present invention.
Figure 8:
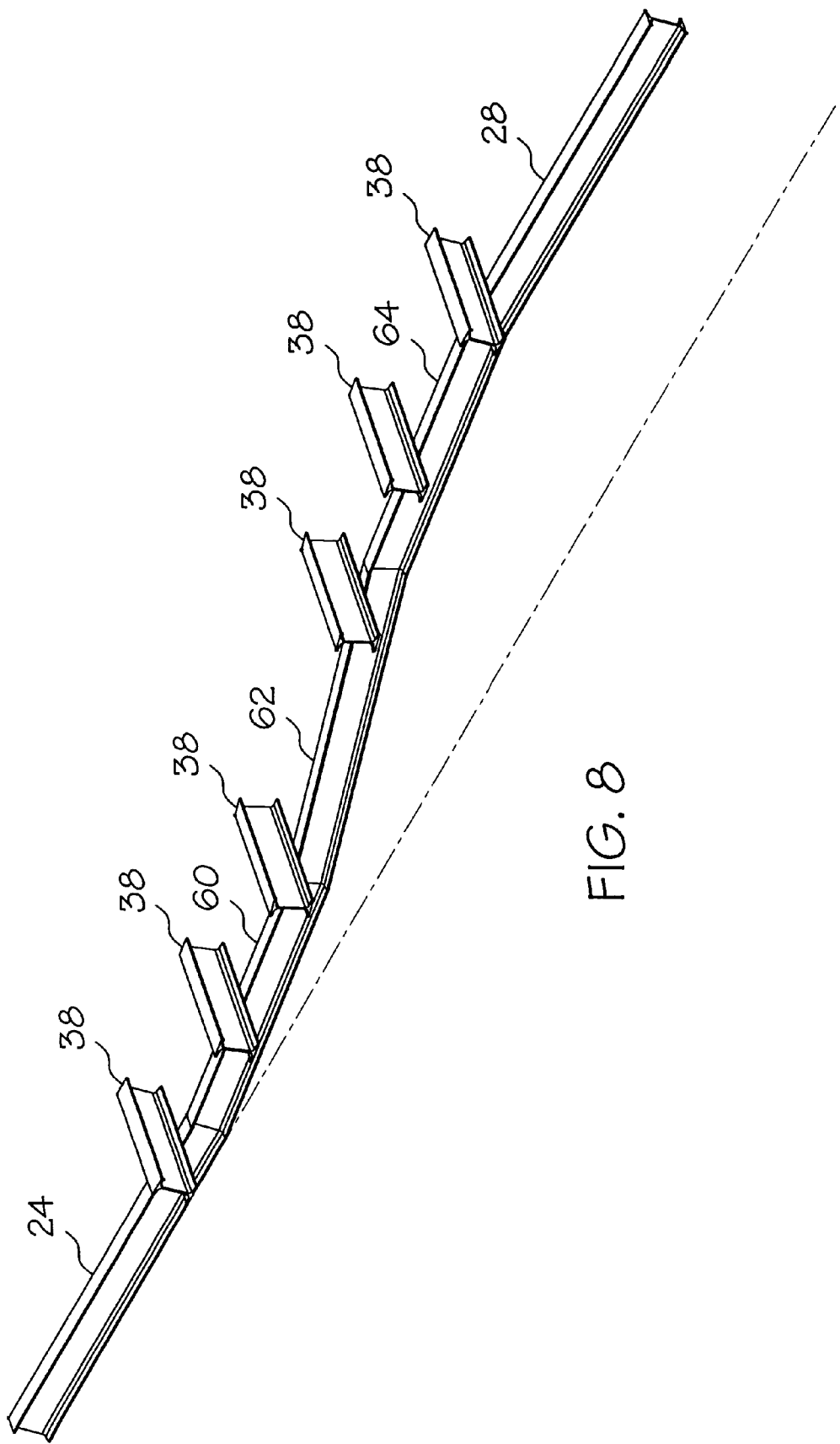
FIG. 8 is an isometric illustration of a conveyor system according to an additional embodiment of the present invention where selected conveyor sections are in an inclined or declined state.
Figure 9:
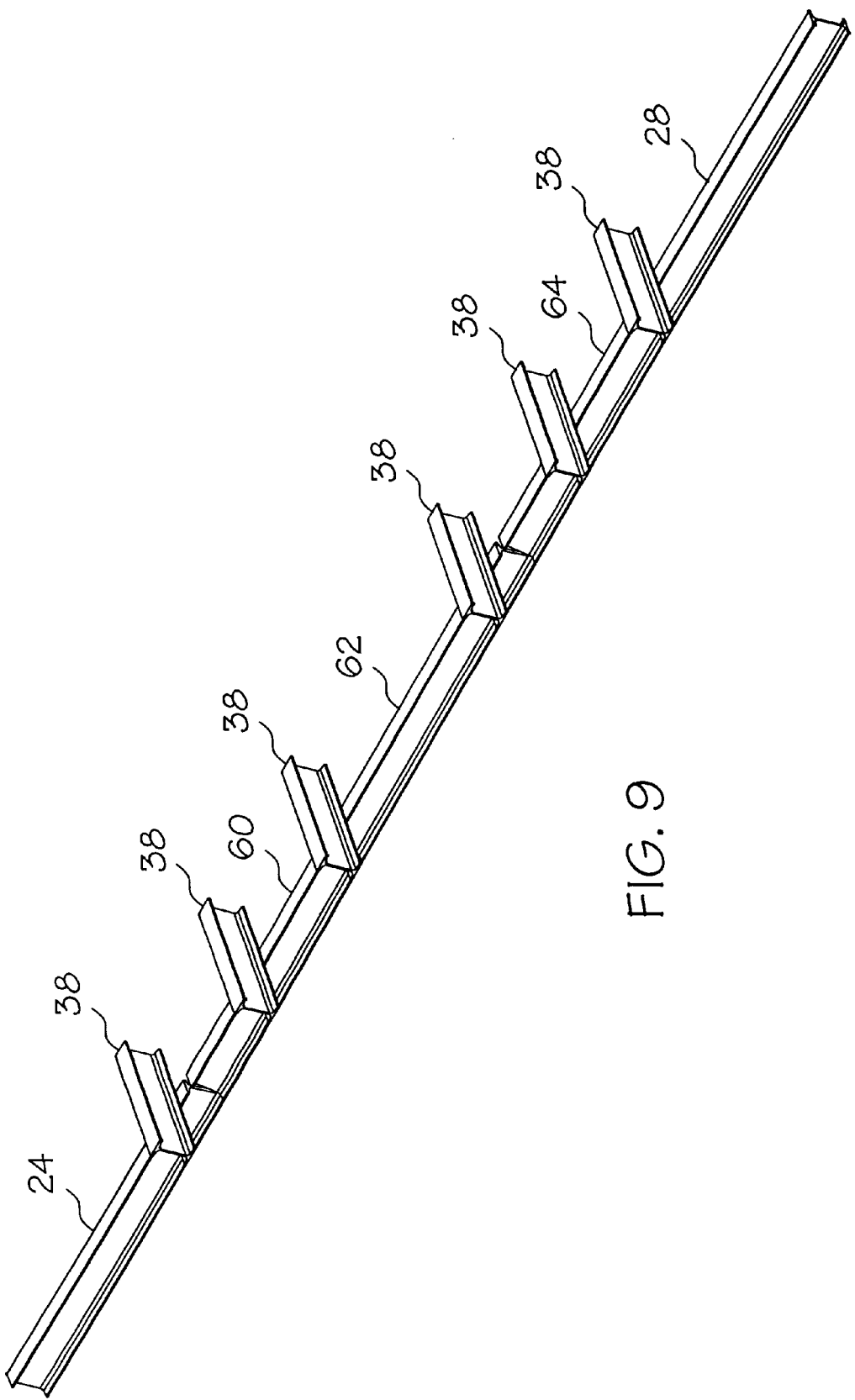
FIG. 9 is an isometric illustration of the conveyor system of FIG. 8 where the conveyor sections are not inclined or declined.

Referring now specifically to FIGS. 5, 6, and 7, a specific example of the structure of the first and second hinge assemblies 18, 20 according to one embodiment of the present invention is illustrated in detail. The first and second hinge assemblies 18, 20, as illustrated, are positioned outside of the conveying path 22, such that the movable load bearing assemblies 14 and the conveyor linkage assembly 16 may move along the conveying path 22 unobstructed by the first and second hinge assemblies 18, 20. The first hinge assembly 18 includes respective hinge subassemblies 19 positioned on opposite sides of the conveying path 22 and the second hinge assembly 20 includes respective hinge subassemblies 21 positioned on opposite sides of the conveying path 22. It is noted that, because of the nature of the views chosen to illustrate the present invention, only the subassemblies 19, 21 on one side of the conveying path are visible in FIGS. 5–7. However, it is noted that the structure and orientation of the subassemblies are identical on both sides of the conveying path. Each hinge subassembly 19, 21 includes a pair of outer hinge plates 44 coupled to one of the conveyor sections 12 via a crossing I-beam 38 and an inner hinge plate 46 coupled to an adjacent one of the conveyor sections 12 via a crossing I-beam 38. As will be appreciated by those practicing the present invention, the crossing I-beam may be replaced with any other suitable structural support member. The inner hinge plate 46 is positioned between the pair of outer hinge plates 44 and is free to rotate about a hinge pivot 48 relative to the outer hinge plates 44. In this manner, the conveyor sections 12 are free to assume respective inclined or declined orientations relative to each other.

In the embodiment of the present invention illustrated in FIGS. 8–11, where like reference numbers are utilized to indicate like structure, the single intermediate conveyor section 26 illustrated in FIGS. 3–6 is replaced with a plurality of transitional conveyor subsections, i.e., a first transitional conveyor subsection 60, a second transitional conveyor subsection 62, and a third transitional conveyor subsection 64. The first transitional conveyor subsection 60 is coupled to the adjacent upstream conveyor section 24 via a first hinge assembly 18'. The second transitional conveyor subsection 62 is coupled to the first subsection 60 via a first transitional hinge assembly 66. The third transitional conveyor subsection 64 is coupled to the second subsection 62 via an additional transitional hinge assembly 68 and is coupled to the adjacent downstream conveyor section 28 via the second hinge assembly 20'.

Figure 10:
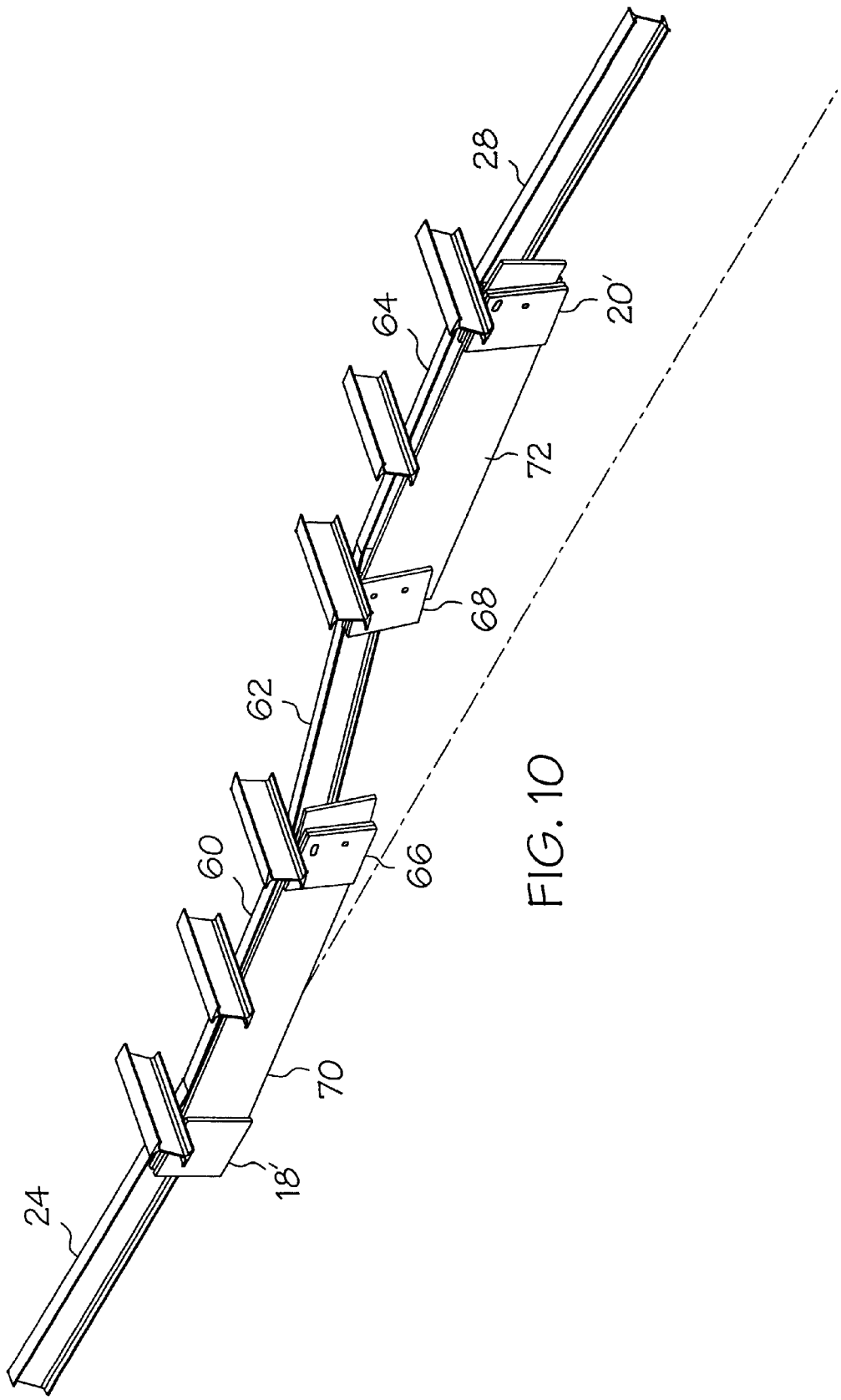
FIG. 10 is an isometric illustration of the conveyor section of FIG. 8, in the inclined declined state, and including a further illustration of hinge assemblies according to one aspect of the present invention.
Figure 11:
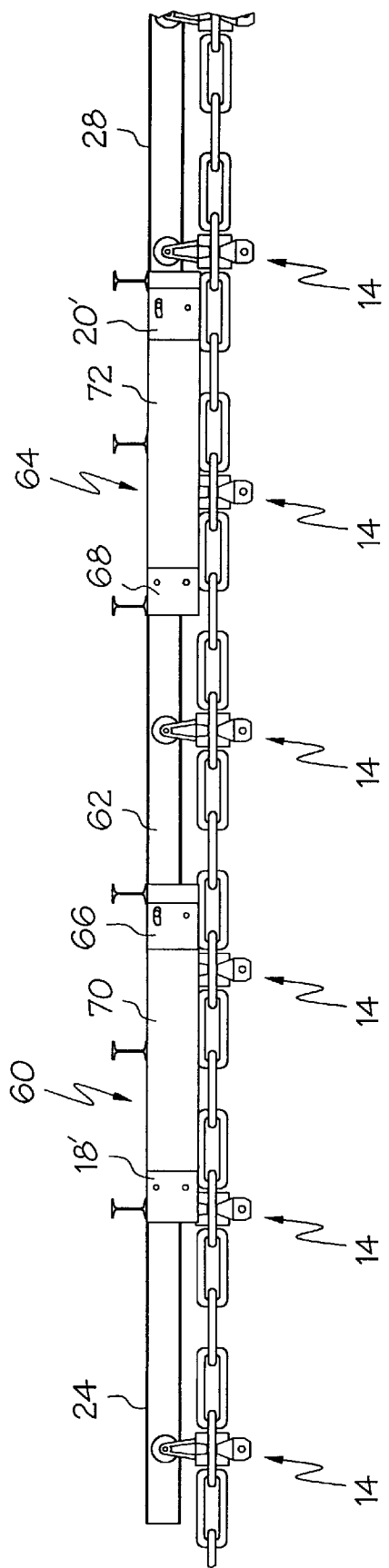
FIG. 11 is an illustration of the conveyor section of FIG. 4, in the non-inclined or non-declined state, and including a further illustration of hinge, load bearing, and linkage assemblies according to one aspect of the present invention.

The only significant difference between the hinge assemblies 18' of the FIGS. 10 and 11 embodiment and the hinge assemblies 18 of the FIGS. 5 and 6 embodiment, lies in the fact that the hinge assemblies 18' utilize a first coupling plate 70 to couple mechanically the hinge assembly 18' to the transitional hinge assembly 66. Similarly, the only significant difference between the hinge assemblies 20' of the FIGS. 10 and 11 embodiment and the hinge assemblies 20 of the FIGS. 5 and 6 embodiment, lies in the fact that the hinge assemblies 20' utilize a second coupling plate 72 to couple the additional hinge assembly 20' to the additional transitional hinge assembly 68 mechanically.

The first hinge assembly 18' is arranged to permit inclination of the first transitional conveyor subsection 60 relative to the adjacent upstream conveyor section 24. The first transitional hinge assembly 66 is arranged to permit inclination of the second transitional conveyor subsection 62 relative to the first transitional conveyor subsection 60. The second transitional hinge assembly 68 is arranged to permit declination of the third transitional conveyor subsection 64 relative to the second transitional conveyor subsection 62. The second hinge assembly 20' is arranged to permit declination of the adjacent downstream conveyor section 28 relative to the third transitional conveyor subsection 64. In this manner, the transitional conveyor subsections 60, 62, 64 are capable of collectively defining a gradual net inclination relative to the adjacent upstream conveyor section 24, i.e., more gradual than what would be provided by the embodiment of FIGS. 3–6 of the present invention.

Figure 12:
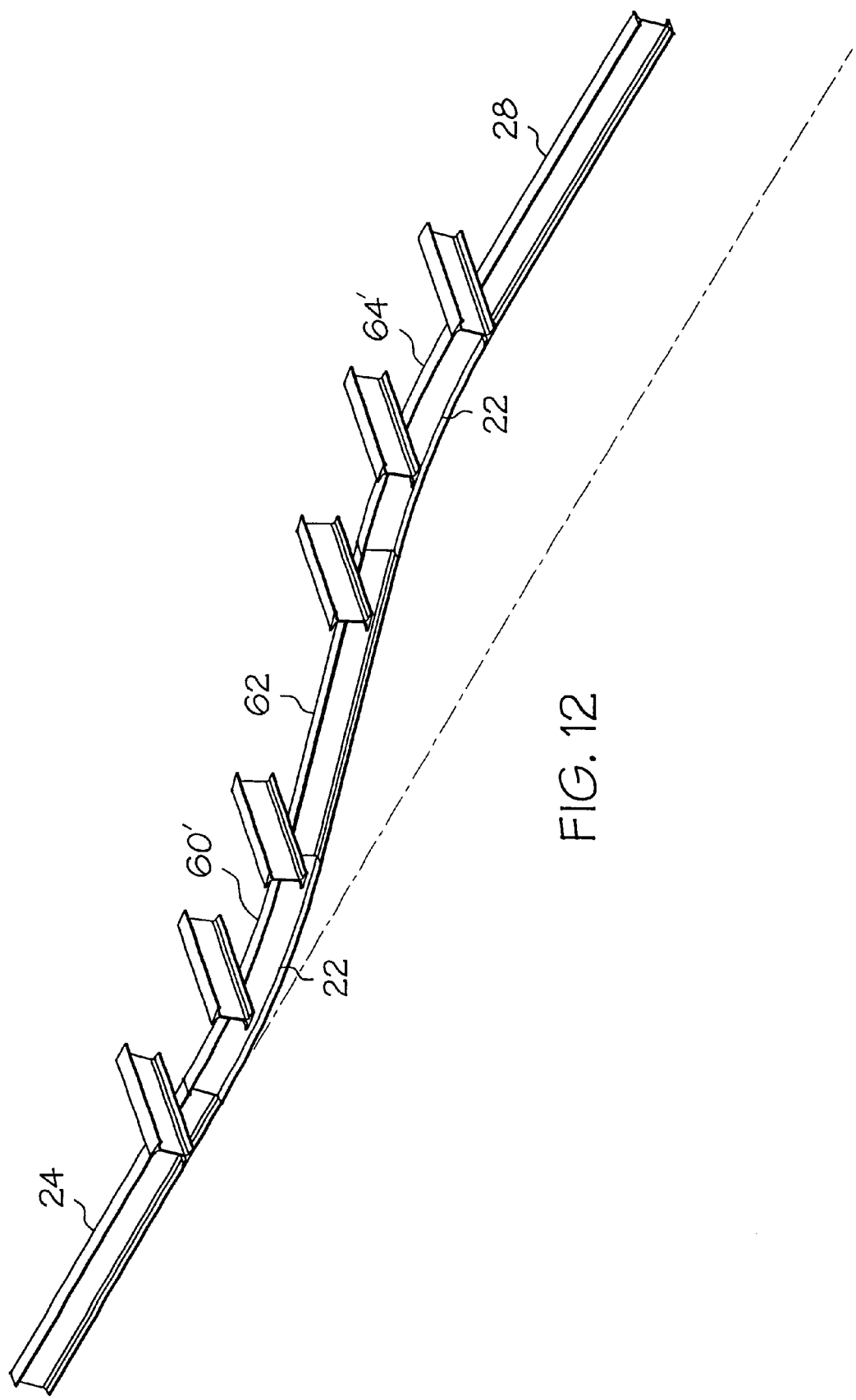
FIG. 12 is an isometric illustration of a conveyor system according to an additional embodiment of the present invention where selected curved conveyor sections are in an inclined or declined state.
Figure 13:
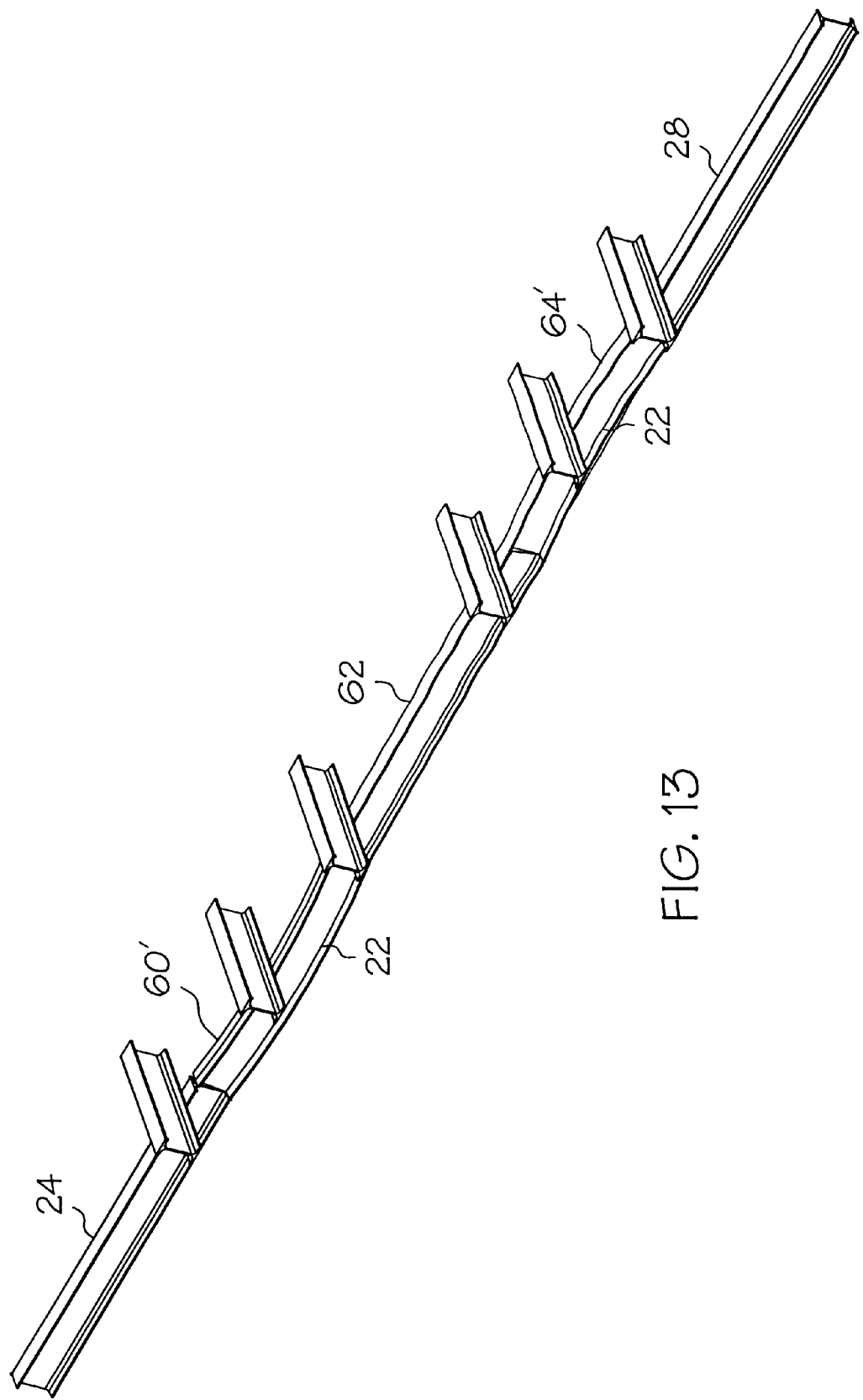
FIG. 13 is an isometric illustration of the conveyor system of FIG. 12 where the selected curved conveyor sections are not inclined or declined.

Referring now to FIGS. 12 and 13, a means of improving the motive translation of load bearing assemblies 14 (see FIGS. 5, 6, and 11) from one conveyor section to the next is illustrated. Specifically, the first transitional conveyor subsection 60' is constructed to define an ascending curve along the conveying path 22 and the third transitional conveyor subsection 64' is constructed so as to define a descending curve along the conveying path 22. The curved sections, so provided, function to provide a more gradual and more smooth transition from one conveyor section to the next.

Figure 16:
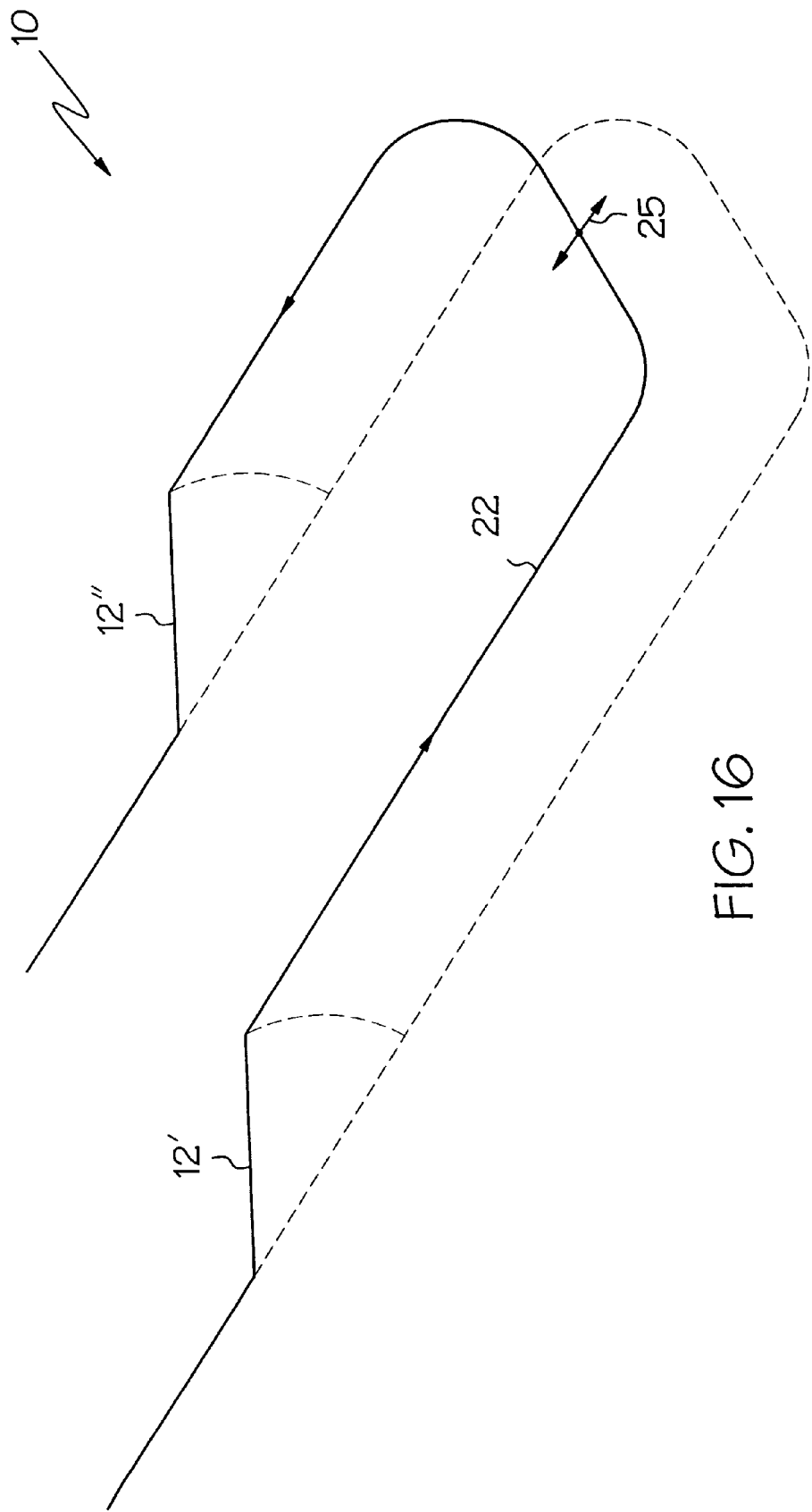
FIG. 16 is a schematic illustration of a U-shaped track according to the present invention.

As will be appreciated by those practicing the present invention, although the load displacement mechanism 4 is primarily arranged to initiate vertical movement of the selected conveyor section 12, it will also be arranged to account for the lateral component of movement of the conveyor section 12 along the conveying path as it is inclined and declined. The degree of lateral translation along the conveying path is defined by the geometry of the respective hinge assemblies and the conveyor section 12. Referring finally to FIG. 16, a U-shaped track according to the present invention is illustrated. It is important to note that, where respective inclined and declined conveyor sections 12' and 12" are provided in a single conveyor system 10, it is preferable to turn the conveying path 22 defined by the conveyor system 10 back on itself to define a U-shaped conveying path. Further, the conveyor system 10 is designed to contribute an appropriate degree of back-and-forth play, as indicated by the arrows 25. Finally, the respective inclined and declined conveyor sections 12' and 12" are arranged to be parallel and to have substantially the same geometry. In this manner, damage due to track buckling or dislocation as a result of the above-noted lateral translation is minimized or completely avoided.

Having described the invention in detail and by reference to preferred embodiments thereof, it will be apparent that modifications and variations are possible without departing from the scope of the invention defined in the appended claims. For example, it is contemplated by the present invention that the direction of conveyance along the conveying path 22 illustrated in the figures need not be merely uni-directional. Rather, the direction of conveyance may extend from left to right along the conveying path 22 or from right to left along the conveying path 22. Further, it is noted that, although each of the figures of the present application illustrate conveyor sections having an I-shaped cross section, the concepts of the present invention are also applicable to other conventional conveyor sections such as "power and free" and enclosed track systems, where C-shaped channels are arranged to oppose each other and form an enclosed track in which the wheels 15 of the load bearing assembly are supported.

What is claimed is:

1. A conveyor system comprising:
   a plurality of conveyor sections defining a conveying path extending from an upstream conveyor section, through at least one intermediate conveyor section, to a downstream conveyor section, wherein each of said at least one intermediate conveyor section includes at least one curved transitional conveyor subsection;

a plurality of movable load bearing assemblies secured to at least one of said conveyor sections such that said load bearing assemblies are free to move along said conveying path from an upstream location to a downstream location;

a conveyor linkage assembly arranged to couple said movable load bearing assemblies for collective movement along said conveying path;

a first hinge assembly arranged to couple a first end of a selected intermediate conveyor section to an adjacent upstream conveyor section, said first hinge assembly being further arranged to permit inclination of said intermediate conveyor section relative to said adjacent upstream conveyor section; and a second hinge assembly arranged to couple a second end of said selected intermediate conveyor section to an adjacent downstream conveyor section, said second hinge assembly being further arranged to permit declination of said downstream conveyor section relative to said intermediate conveyor section.

2. A conveyor system as claimed in claim 1 wherein said intermediate conveyor section comprises a plurality of curved transitional conveyor subsections and a transitional hinge assembly defining a transitional conveying path extending between said upstream conveyor section and said downstream conveyor section.

3. A conveyor system as claimed in claim 2 wherein said transitional hinge assembly permits said plurality of curved transitional conveyor subsections to define a net inclination of said intermediate conveyor section collectively relative to said upstream conveyor section, and wherein said transitional hinge assembly permits one of said curved transitional conveyor subsections to decline relative to another of said curved transitional conveyor subsections.

4. A conveyor system as claimed in claim 2 wherein said curved transitional conveyor subsections are coupled to each other along said transitional conveying path through respective transitional hinge assemblies.

5. A conveyor system as claimed in claim 2 wherein at least one of said curved transitional conveyor subsections defines a curve along said conveying path in the direction of said inclined orientation.

6. A conveyor system as claimed in claim 2 wherein one of said curved transitional conveyor subsections is arranged to define an ascending curve along said conveying path and another of said curved transitional conveyor subsections is arranged to define a descending curve along said conveying path.

7. A conveyor system as claimed in claim 1 wherein said first and second hinge assemblies each include respective hinge subassemblies positioned on opposite sides of said conveying path.

8. A conveyor system as claimed in claim 7 wherein each hinge subassembly includes a pair of outer hinge plates coupled to one of said conveyor sections and an inner hinge plate coupled to an adjacent conveyor section, and wherein said inner hinge plate is positioned between said pair of outer hinge plates and is free to rotate about a hinge pivot relative to said outer hinge plates.

9. A conveyor system as claimed in claim 1 wherein each hinge assembly includes a pair of outer hinge plates coupled to one of said conveyor sections and an inner hinge plate coupled to an adjacent conveyor section, and wherein said inner hinge plate is positioned between said pair of outer hinge plates and is free to rotate about a hinge pivot relative to said outer hinge plates.

10. A conveyor system as claimed in claim 1 wherein said conveyor sections define respective I-shaped cross sections.

11. A conveyor system as claimed in claim 1 wherein said movable load bearing assemblies comprise respective hangers arranged to move along said conveying path.

12. A conveyor system as claimed in claim 1 wherein said conveyor sections define respective I-shaped cross sections, wherein said movable load bearing assemblies comprise respective hangers supported by a lower portion of said I-beam cross section via a pair of wheels secured to respective ones of said hangers, wherein said pair of wheels are positioned on opposite sides of a longitudinal portion of said I-shaped cross section.

13. A conveyor system as claimed in claim 1 wherein said conveyor linkage assembly comprises a series of chain links arranged to couple said plurality of movable load bearing assemblies to each other along said conveying path.

14. A conveyor system as claimed in claim 13 wherein adjacent ones of said chain links are arranged to incorporate sufficient mechanical play relative to one another to correspond to said recited inclination and declination of said respective conveyor sections.

15. A conveyor system as claimed in claim 1 wherein said first and second hinge assemblies are positioned outside of said conveying path, such that respective ones of said plurality of movable load bearing assemblies and said conveyor linkage assembly may move along said conveying path unobstructed by said first and second hinge assemblies.

16. A conveyor system comprising:

(1) a plurality of conveyor sections defining a conveying path extending from an upstream conveyor section, through at least one intermediate conveyor section, to a downstream conveyor section, wherein said at least one intermediate conveyor section comprise curved I-beam sections;

(2) a plurality of movable load bearing assemblies secured to at least one of said conveyor sections such that said load bearing assemblies are free to move along said conveying path from an upstream location to a downstream location;

(3) a conveyor linkage assembly arranged to couple said movable load bearing assemblies for collective movement along said conveying path;

(4) a first hinge assembly arranged to couple a first end of a selected intermediate conveyor section to an adjacent upstream conveyor section, said first hinge assembly being further arranged to permit inclination of said intermediate conveyor section relative to said adjacent upstream conveyor section;

(5) a second hinge assembly arranged to couple a second end of said selected intermediate conveyor section to an adjacent downstream conveyor section, said second hinge assembly being further arranged to permit declination of said downstream conveyor section relative to said intermediate conveyor section, wherein (a) said intermediate conveyor section comprises (i) a first transitional conveyor subsection coupled to said adjacent upstream conveyor section via said first hinge assembly, (ii) a second transitional conveyor subsection coupled to said first subsection via a first transitional hinge assembly, and (iii) a third transitional conveyor subsection coupled to said second subsection via an additional transitional hinge assembly and coupled to said adjacent downstream conveyor section via said second hinge assembly,
- (b) said first hinge assembly is arranged to permit inclination of said first transitional conveyor subsection relative to said adjacent upstream conveyor section,
- (c) said first transitional hinge assembly is arranged to permit inclination of said second transitional conveyor subsection relative to said first transitional conveyor subsection,
- (d) said second transitional hinge assembly is arranged to permit declination of said third transitional conveyor subsection relative to said second transitional conveyor subsection, and
- (e) said second hinge assembly is arranged to permit declination of said adjacent downstream conveyor section relative to said third transitional conveyor subsection.

17. A conveyor system as claimed in claim 16 wherein said first transitional conveyor subsection defines an ascending curve along said conveying path, and wherein said third transitional conveyor subsection defines a descending curve along said conveying path.

18. A conveyor system as claimed in claim 17 wherein said ascending curve is defined by substantially the entire length of said first transitional conveyor subsection and said descending curve is defined by substantially the entire length of said third transitional conveyor subsection.

19. A conveyor system comprising:
- a plurality of conveyor sections defining a conveying path extending from an upstream conveyor section, through at least one intermediate conveyor section, to a downstream conveyor section, wherein said intermediate conveyor section includes at least one curved transitional conveyor subsection, and wherein said transitional conveyor subsection comprises a curved I-beam section;
- a plurality of movable load bearing assemblies secured to at least one of said conveyor sections such that said load bearing assemblies are free to move along said conveying path from an upstream location to a downstream location;
- a conveyor linkage assembly arranged to couple said movable load bearing assemblies for collective movement along said conveying path;
- a first hinge assembly arranged to couple a first end of a selected intermediate conveyor section to an adjacent upstream conveyor section, said first hinge assembly being further arranged to permit declination of said intermediate conveyor section relative to said adjacent upstream conveyor section; and
- a second hinge assembly arranged to couple a second end of said selected intermediate conveyor section to an adjacent downstream conveyor section, said second hinge assembly being further arranged to permit inclination of said downstream conveyor section relative to said intermediate conveyor section.

20. A conveyor system as claimed in claim 19 wherein said intermediate conveyor section further comprises a plurality of curved transitional conveyor subsections and a transitional hinge assembly defining a transitional conveying path extending between said upstream conveyor section and said downstream conveyor section, said transitional hinge assembly permits said plurality of curved transitional conveyor subsections to define a net declination of said intermediate conveyor section collectively relative to said upstream conveyor section, and
said transitional hinge assembly permits one of said curved transitional conveyor subsections to incline relative to another of said transitional conveyor subsections.

21. A conveyor system as claimed in claim 20 wherein one of said curved transitional conveyor subsections is arranged to define a descending curve along said conveying path and another of said curved transitional conveyor subsections is arranged to define an ascending curve along said conveying path.

22. A conveyor system as claimed in claim 19 wherein said intermediate conveyor section comprises:
- a first curved transitional conveyor subsection coupled to said adjacent upstream conveyor section via said first hinge assembly;
- a second curved transitional conveyor subsection coupled to said first curved subsection via a first transitional hinge assembly;
- a third transitional conveyor subsection coupled to said second curved subsection via an additional transitional hinge assembly and coupled to said adjacent downstream conveyor section via said second hinge assembly; wherein
  - said first hinge assembly is arranged to permit declination of said first curved transitional conveyor subsection relative to said adjacent upstream conveyor section,
  - said first transitional hinge assembly is arranged to permit declination of said second curved transitional conveyor subsection relative to said first curved transitional conveyor subsection,
  - said second transitional hinge assembly is arranged to permit inclination of said third curved transitional conveyor subsection relative to said second curved transitional conveyor subsection, and
  - said second hinge assembly is arranged to permit inclination of said adjacent downstream conveyor section relative to said third curved transitional conveyor subsection.

23. A conveyor system as claimed in claim 22 wherein said first curved transitional conveyor subsection defines a descending curve along said conveying path, and wherein said third curved transitional conveyor subsection defines an ascending curve along said conveying path.

24. A conveyer system comprising:
- a plurality of conveyor sections defining a conveying path extending from an upstream conveyor section, through at least one intermediate conveyor section, to a downstream conveyor section, wherein said at least one intermediate conveyor section comprises at least one curved transitional conveyor subsection, said at least one curved transitional conveyor subsection comprising at least one curved I-beam section;
- a plurality of movable load bearing assemblies secured to at least one of said conveyor sections such that said load bearing assemblies are free to move along said conveying path from an upstream location to a downstream location;
- a conveyor linkage assembly arranged to couple said movable load bearing assemblies for collective movement along said conveying path;
- a first hinge assembly arranged to couple a first end of a selected intermediate conveyor section to an adjacent upstream conveyor section, said first hinge assembly being further arranged to permit inclination of said intermediate conveyor section relative to said adjacent upstream conveyor section;

a second hinge assembly arranged to couple a second end of said selected intermediate conveyor section to an adjacent downstream conveyor section, said second hinge assembly being further arranged to permit declination of said downstream conveyor section relative to said intermediate conveyor section;

at least one product treatment station positioned along said conveying path; and at least one load displacement mechanism operative to initiate selectively said inclination and said declination of a selected intermediate conveyor section such that a product coupled to at least one of said load bearing assemblies is positioned selectively within said product treatment station.

25. A conveyer system as claimed in claim 24 wherein said load displacement mechanism is coupled to either said upstream conveyor section or said downstream conveyor section, whereby said inclination and said declination of a selected intermediate conveyor section is initiated indirectly.

* * * * *